United States Patent
Sridhar

(10) Patent No.: US 9,414,615 B2
(45) Date of Patent: Aug. 16, 2016

(54) GEL-BASED COMPOSITIONS AND METHODS OF MAKING SAME

(75) Inventor: Vidya Sridhar, Valhalla, NY (US)

(73) Assignee: PepciCo, Inc., Purchase, NY (US)

( * ) Notice: Subject to any disclaimer, the term of this patent is extended or adjusted under 35 U.S.C. 154(b) by 37 days.

(21) Appl. No.: 13/007,798

(22) Filed: Jan. 17, 2011

(65) Prior Publication Data

US 2011/0177176 A1 Jul. 21, 2011

Related U.S. Application Data

(60) Provisional application No. 61/295,949, filed on Jan. 18, 2010.

(51) Int. Cl.
- A61K 47/00 (2006.01)
- A61K 36/254 (2006.01)
- A61K 31/70 (2006.01)
- A23L 1/05 (2006.01)
- A23L 1/06 (2006.01)
- A23L 1/0524 (2006.01)
- A23L 1/0526 (2006.01)
- A23L 1/0532 (2006.01)
- A23L 1/054 (2006.01)
- A23L 1/30 (2006.01)
- A23L 1/302 (2006.01)
- A23L 1/305 (2006.01)

(52) U.S. Cl.
CPC ............ *A23L 1/0524* (2013.01); *A23L 1/0526* (2013.01); *A23L 1/0532* (2013.01); *A23L 1/0545* (2013.01); *A23L 1/30* (2013.01); *A23L 1/302* (2013.01); *A23L 1/3051* (2013.01)

(58) Field of Classification Search
None
See application file for complete search history.

(56) References Cited

U.S. PATENT DOCUMENTS

| | | | |
|---|---|---|---|
| 2,809,894 A | 10/1957 | Poarch | |
| 3,367,784 A | 2/1968 | Waitman | |
| 3,658,556 A * | 4/1972 | Klein et al. | 426/573 |
| 4,089,981 A | 5/1978 | Richardson | |
| 4,268,533 A | 5/1981 | Williams et al. | |
| 5,123,829 A | 6/1992 | Eason et al. | |
| 6,702,462 B2 | 3/2004 | Richardson | |
| 6,989,171 B2 | 1/2006 | Portman | |
| 7,008,654 B1 | 3/2006 | Fuchs | |
| 7,150,880 B2 | 12/2006 | Howard | |
| 2002/0168460 A1 * | 11/2002 | Soumya et al. | 426/575 |
| 2003/0008054 A1 * | 1/2003 | Gordon et al. | 426/573 |
| 2003/0088054 A1 * | 5/2003 | Chasar et al. | 528/405 |
| 2003/0091613 A1 | 5/2003 | DeWille et al. | |
| 2004/0258826 A1 | 12/2004 | Koren | |
| 2005/0095271 A1 | 5/2005 | Mathewson | |
| 2005/0152660 A1 | 7/2005 | Heideman | |
| 2005/0244543 A1 * | 11/2005 | Takaichi et al. | 426/74 |
| 2005/0260322 A1 * | 11/2005 | Takaichi et al. | 426/573 |
| 2005/0266137 A1 | 12/2005 | Eppler et al. | |
| 2006/0239956 A1 | 10/2006 | Henson et al. | |
| 2006/0280777 A1 | 12/2006 | Schydlowsky | |
| 2007/0020370 A1 | 1/2007 | Schymura | |
| 2007/0116820 A1 * | 5/2007 | Prakash et al. | 426/548 |
| 2007/0212460 A1 * | 9/2007 | Inoue et al. | 426/268 |
| 2008/0226786 A1 | 9/2008 | Ward et al. | |
| 2008/0268092 A1 | 10/2008 | Dacanay | |
| 2009/0041897 A1 | 2/2009 | Gamay | |
| 2009/0041911 A1 | 2/2009 | Gamay | |

FOREIGN PATENT DOCUMENTS

| | | |
|---|---|---|
| CN | 1260686 | 7/2000 |
| CN | 1440239 A | 9/2003 |
| CN | 1708237 A | 12/2005 |
| CN | 101309688 A | 11/2008 |
| EP | 0605097 | 7/1994 |
| EP | 0619081 | 10/1994 |
| RU | 2262241 | 11/2004 |
| WO | 9600018 | 1/1996 |
| WO | 9707690 | 3/1997 |
| WO | 9847390 | 10/1998 |
| WO | 0067582 | 11/2000 |
| WO | 0143564 | 6/2001 |

OTHER PUBLICATIONS

Clark, N. (2006) Engineered Sports Foods: A Primer. (available at: http://www.active.com/articles/engineered-sports-foods-a-primer). Downloaded from website: Jul. 25, 2014.*
Powell, B (2008) Energy Gel Comparison. (available at: http://www.irunfar.com/2008/12/energy-gel-comparison.html). Downloaded from website: Jul. 25, 2014.*
Website document entitled: Food Gums. (Available at: http//:www.foodadditives.org/food_gums/common.html). Downloaded from website Jul. 25, 2014.*
Website document entitled: Energy Gel Central: Ingredient Glossary. (Available at: http://www.energygelcentral.com/energy-gel-basics/ingredient-glossary). Downloaded from website: Jul. 25, 2014.*
Gerson, C. (2005) Energy Gels: Does the new fad in sports nutrition really improve endurance? (Availabe at: http://healthpsych.psy.vanderbilt.edu/SportsGels.htm). Downloaded from website: Jul. 25, 2014.*
International Search Report and Written Opinion for PCT/US2011/021510 mailed Feb. 25, 2011.
Russian Application No. 2012135510 Office Action mailed Aug. 22, 2013.
Chinese Application No. 201180009512.9 Office Action dated Nov. 20, 2013.
Chinese Application No. 201180009512.9 Office Action dated May 15, 2014.
CN Application No. 201180009512.9 Office Action dated Mar. 21, 2013.
RU Applicatioin No. 2012135510 Office Action mailed May 24, 2013.
CN Application No. 201180009512.9 Office Action dated Sep. 16, 2014.

* cited by examiner

*Primary Examiner* — Chris R Tate
*Assistant Examiner* — Russell Fiebig
(74) *Attorney, Agent, or Firm* — Sterne, Kessler, Goldstein & Fox P.L.L.C.

(57) ABSTRACT

A gel-based comestible and method of preparing same. In one embodiment of the invention, the gel-based comestible is consumed in one bite without the need for a spoon or other utensil, and supplies the consumer with about 200 mg/serving caffeine, 1000 mg/serving taurine, and 100% of the recommended daily allowances of vitamins $B_3$, $B_5$, $B_6$ and $B_{12}$.

8 Claims, No Drawings

GEL-BASED COMPOSITIONS AND METHODS OF MAKING SAME

This application claims priority to U.S. Provisional Patent Application No. 61/295,949 filed on Jan. 18, 2010, the disclosure of which is expressly incorporated herein by reference in its entirety.

FIELD OF THE INVENTION

The present invention relates to an easy-to consume, preferably shelf stable, gel-based product that could be preferably consumed in one bite without a spoon. More particularly, the invention relates to a soft gel-based product containing a gum and additional ingredients including, but not limited to food-grade acid, sodium citrate, calcium lactate, nutritive and non-nutritive sweetener, color, flavor, functional ingredients or combinations of these ingredients. One aspect of the present invention relates to an easy-to-consume energy gel composition containing at least caffeine, taurine, a vitamin B complex and a gum.

BACKGROUND OF THE INVENTION

In today's fast-paced society, where consumers are constantly on-the-go, a need exists for easy-to consume shelf-stable comestibles that could be preferably consumed in one bite without a spoon or other eating utensil. An example of such a comestible is an easy-to-consume gel-based product.

In particular, when individuals work long hours, are involved in many extracurricular activities, and have many competing obligations, the vast majority of these individuals consume caffeinated beverages in order to stay alert, awake, and focused. Therefore, a need exists for an easy-to-consume energy comestible that delivers functional ingredients, such as caffeine, taurine, and vitamin B complex. Functional foods or ingredients are food components or whole foods that may provide health benefits beyond basic nutrition and are believed to promote health or in some cases, as part of a healthy diet, reduce the risk of certain diseases. General categories of functional ingredients include, without limitation, plant sterols, antioxidants, phytochemicals, omega 3 fatty acids, vitamin D and fiber. Moreover, although many liquids, such as coffee and energy drinks, may deliver caffeine, it is desirable to have an energy gel composition that easily delivers caffeine and other functional ingredients in a solid form in one bite or swallow to promote alertness and provide an individual with additional energy.

BRIEF SUMMARY OF THE INVENTION

The present invention relates to a soft, JELL-O® like preferably shelf stable gel-based comestible that could be preferably consumed directly from its package without a spoon in one bite, and a method for making this comestible. In one aspect of the present invention the comestible includes at least one gum, at least one buffering agent, at least one calcium ion source, and at least one bulking agent. In another aspect of the present invention, the comestible includes the ingredients listed in the immediately preceding sentence along with at least one flavor, at least one color, at least one food-grade acid, and at least one sweetener. In yet another aspect of the present invention, the comestible includes at least one gum, at least one buffering agent, at least one calcium ion source, and at least one bulking agent, along with at least one preservative, caffeine, taurine, and vitamin B complex to create an energy gel composition. In one aspect of the present invention, the energy gel composition also includes without limitation additional functional ingredients such as maltodextrin, D-Ribose, L-carnitine, β-alanine, and ginseng and guarana.

Yet another aspect of the present invention is directed to a method of preparing the gel-based comestible, such as an energy gel composition, including mixing the ingredients, hydrating the gum, holding, and cooling.

DETAILED DESCRIPTION OF THE INVENTION

The present invention relates to a preferably shelf-stable gel composition. More specifically, the present invention relates to a preferably shelf-stable gel comestible containing a gum-based gel. Moreover, another aspect of the present invention relates to an energy gel composition. The gel-based composition has a firm structure, yet is easily consumed in one bite or swallow by the consumer preferably directly from the package, without the need for a spoon or other utensil. The composition preferably has a serving size of about 0.5 oz. to about 2.0 oz.

The preferably shelf-stable gel comestible may comprise a gum-based gel. Gums that may be used in the gum-based gel include, but are not limited to, carrageenan, locust bean gum, xanthan gum, gellan gum, pectin, carboxymethyl cellulose, and combinations thereof. The gum-based gel composition may also include at least one buffering agent, at least one bulking agent, and at least one calcium ion source. Suitable calcium ion sources may include, but are not limited to, calcium disodium edetate, calcium citrate, calcium lactate, calcium chloride, and calcium carbonate. The buffering agent used in accordance with the present invention may include, without limitation, sodium citrate, trisodium citrate, potassium citrate and combinations of these ingredients. Examples of bulking agents that may be used in accordance with the present invention include, without limitation, sucrose, maltodextrin, dextrin, pectin and combinations thereof.

Citric acid, ascorbic acid, adipic acid, acetic acid, lactic acid, formic acid, oxalic acid, tartaric acid, fumaric acid, malic acid, phosphoric acid and combinations of these food-grade acids may also be used in the present invention. Additionally, or alternatively, the gel-based comestible may also include at least one sweetener (nutritive and/or non-nutritive), at least one color, at least one flavor, at least one functional ingredient or combinations of the aforementioned ingredients.

In accordance with at least one aspect of the invention, the gel-based comestible is an energy gel composition containing caffeine, taurine, at least one gum, at least one buffering agent, at least one calcium source, at least one bulking agent, at least one nutritive or non-nutritive sweetener, at least one preservative, and at least one food-grade acid. The energy gel composition may include additional ingredients, such as flavors, colors, and other functional ingredients. The energy gel composition described herein is easily consumed in one bite or swallow by the consumer, lending itself to easy and fast consumption to increase alertness or otherwise provide the consumer with added energy. With respect to the present invention, "effective amount" refers to an amount of the energy gel composition, preferably in a serving size ranging from about 0.5-2.0 oz, delivered to an individual necessary to promote alertness or provide the individual with added energy.

In one embodiment of the energy gel composition made in accordance with the present invention, the energy gel composition includes caffeine, taurine, at least one additional functional ingredient, a gum, at least one sweetener, at least one preservative, and at least one food-grade acid. The one additional functional ingredient may include, without limitation, vitamin B complex, ginseng, guarana, D-ribose, L-carnitine, β-alanine, amino blend (leucine, isoleucine, histidine, valine), maltodextrin (70-80% of the complex/simple carbohydrates blend), electrolytes (sodium, potassium and calcium salts), vitamin $B_2$, antioxidant blend (conjugated linoleic acid (CLA), spirulina, lycopene, acai, pomegranate, rosemary extract, blueberry extract, Vitamin A, E and C), vitamin D, vitamin K, biotin, green tea extract, theanine, red clover, passion flower, choline, folic acid, minerals (Zn, Mg, Ca, K, Na, chromium, phosphorous), plant sterol, fiber (aloevera, soy, beta glucan, resistant starch, guar gum, inulin, gelatin, lutein, beta carotene) or mixtures of these ingredients. The vitamin B complex used in accordance with the present invention may consist of vitamin $B_3$, vitamin $B_5$, vitamin $B_6$, and vitamin $B_{12}$. One of ordinary skill in the art would appreciate that other vitamins and/or antioxidant blends may be used in accordance with the present invention.

The gum used in the present invention may be a food-grade gum including, without limitation, carrageenan, locust bean gum, gellan or xanthan gum. Alternatively, the gum may comprise a gum blend including at least two of carrageenan, gellan gum, locust bean gum, and xanthan gum. In another aspect of the present invention, the gum blend may also include trisodium citrate, dextrin, a calcium ion source such as calcium lactate, calcium citrate, and mixtures of these ingredients.

The at least one sweetener used in accordance with the present invention may be selected from any suitable non-nutritive sweeteners either alone or in combination with nutritive sweeteners. Examples of such nutritive and non-nutritive sweeteners include, without limitation, sucrose, high fructose corn syrup, fructose, dextrose, sucralose, aspartame, acesulfame K, saccharin, cyclamate, alitame, honey, agave, and all brands of stevia (Reb A extract). One of ordinary skill in the art at the time of the invention would appreciate that other sweeteners may be used in accordance with the present invention.

In another aspect of the present invention, the energy gel composition comprises caffeine, taurine, at least one additional functional ingredient, at least one gum, at least one sweetener, at least one preservative, a vitamin B complex, and at least one food-grade acid. The vitamin B complex may comprise vitamins $B_3$, $B_5$, $B_6$ and $B_{12}$. The at least one additional functional ingredient may be ginseng, guarana, D-ribose, L-carnitine, β-alanine, amino blend (including basic amino acids such as leucine, isoleucine, histidine, valine), maltodextrin (70-80% of the complex/simple carbohydrates blend), electrolytes (sodium, potassium and calcium salts), vitamin $B_2$, antioxidant blend (vitamin E and vitamin C) and mixtures of these ingredients.

The at least one food-grade acid used in accordance with the present invention may include, without limitation, citric acid, ascorbic acid, adipic acid, acetic acid, lactic acid, formic acid, oxalic acid, tartaric acid, fumaric acid, malic acid, and phosphoric acid and combinations thereof. The at least one preservative may include, without limitation, calcium disodium edetate, sodium hexametaphosphate, potassium sorbate, sodium benzoate, potassium cinnamate, lauric arginate (mirenat) and combinations thereof. The pH of the gel-based composition is between about 3.0 and 4.5, generally between about 3.2 and 3.8, such as 3.5. One or more buffering agents, and chelators, such as sodium citrate and calcium disodium edetate, may also be added to the gel-based composition described herein. One or more calcium ion source such as calcium lactate, calcium chloride, calcium carbonate is used to create the gel matrix.

Additional ingredients such as food-grade colors derived from both natural and artificial sources may be added to the gel-based composition. Examples of such colors include Yellow 5, Yellow 6, Red 40, Blue 1, cochineal extract, beta carotene, fruit based colors, vegetable based colors, lycopene, natural blue and combinations thereof. Flavors and flavor modifiers including, without limitation, lime, lemon, orange, grapefruit; strawberry, blueberry, josta berry, fruit, cherry, malt, beer, chocolate, coffee, tea, acai, pomegranate, hibiscus, tamarind, mango, peach, pineapple, melon, watermelon, taste modifier and combinations thereof may also be added to the gel composition in accordance with the present invention.

Moreover, the gel-based composition of the present invention remains firm and in a solid state at or below room temperature and up to a temperature of about 125° F. Although the gel-based composition is a solid, it can be easily delivered and consumed by the consumer in one bite, gulp, or swallow, preferably without the need for a spoon or other utensil. The serving size of the gel composition may range preferably from about 0.5 oz to 2 oz, Moreover, as one of ordinary skill in the art would appreciate, the calorie content of the gel-based composition varies in light of the ingredients added to the composition may range preferably from about 0 calories to about 200 calories per serving.

In yet another aspect of the present invention, the serving size of the comestible of the present invention may range from about 0.5 oz to 5.0 oz., for use as a meal replacement.

In one aspect of the present invention the gel-based composition is prepared by introducing at least one bulking agent, such as sucrose in combination with at least one gum, at least one source of calcium ion, and at least one buffering agent into a mixer. The gum is hydrated for about 10-30 minutes at a temperature of about 155°-195° F., such as 20 minutes at about 175° F., to create a hydrated gum mixture. Any additional ingredients (such as functional ingredients, sweeteners (nutritive and non-nutritive), food-grade acid, color, and flavor) are then added to the hydrated gum mixture, followed by the addition of the at least one food-grade acid. The hydrated gum mixture may be held for 30-120 minutes, such as 60 minutes at a temperature between about 145° F. and 175° F., such as 155° F., prior to packaging and cooling to set the gel and form the gel composition.

In another aspect of the present invention, the hydrated gum mixture is filled into containers of a preferred shape prior to cooling at temperatures between about 145-175° F. and subsequently cooled to temperatures between 70-100° F. for about 30-90 minutes to set the gel. In another aspect of the present invention, the gel-based composition is packaged following cooling.

The following are examples of various embodiments of the present invention:

Example 1

The energy gel composition is comprised of the following components:

| Ingredients | Concentration in grams/liter | |
|---|---|---|
| | Amount | Acceptable Range |
| Potassium Sorbate | 0.50 | 0.25-0.75 |
| Sodium Benzoate | 0.40 | 0.20-0.60 |
| Sodium Citrate | 1.50 | 1.00-2.00 |
| Sucrose | 210.00 | 0.00-300.00 |

-continued

Concentration in grams/liter

| Ingredients | Amount | Acceptable Range |
|---|---|---|
| Gum Blend * | 12.00 | 6.00-18.00 |
| Sucralose 25% soln | 4.50 | 0.00-10.00 |
| Caffeine (anhydrous) | 4.60 | 0.00-10.00 |
| Guarana | 0.50 | 0.00-10.00 |
| Ginseng | 0.50 | 0.00-10.00 |
| Taurine | 25.00 | 0.00-50.00 |
| D-Ribose | 0.50 | 0.00-10.00 |
| Maltodextrin | 1.20 | 0.00-10.00 |
| L-Carnitine | 0.50 | 0.00-10.00 |
| Beta-Alanine | 0.50 | 0.00-10.00 |
| Calcium Disodium Edetate | 0.04 | 0.10-0.0 |
| Vitamin B premix ** | 1.40 | 0.0-3.0 |
| Citric acid | 6.00 | 3.0-9.0 |
| Color | 0.03 | 0.00-0.04 |
| Flavor + Flavor modifier | 8.00 | 4.00-12.00 |

Concentration in %

| | Amount | Acceptable Range |
|---|---|---|
| * = Gum Blend Ingredients | | |
| Xanthan | 6.0 | 3.0-9.0 |
| Locust Bean Gum | 6.0 | 3.0-9.0 |
| Gellan | 9.0 | 5.0-14.0 |
| Carrageenan | 24.0 | 12.0-36.0 |
| Calcium lactate | 8.0 | 4.0-12.0 |
| Trisodium citrate | 8.0 | 4.0-12.0 |
| Dextrin | 39.0 | 20.0-60.0 |
| ** = Vitamin Premix Ingredients | | |
| B3 | 42.0 | 21.0-63.0 |
| B5 | 37.0 | 18.0-55.0 |
| B6 | 6.0 | 3.0-9.0 |
| B12 | 0.02 | 0.01-0.03 |

The final pH of the composition is 3.5. Moreover, the caffeine and taurine concentrations per serving are about 200 mg/serving and 1000 mg/serving respectively. The vitamin B complex contains 100% of the recommended daily allowances for vitamins $B_3$, $B_5$, $B_6$ and $B_{12}$. The total amount of calories contained in the energy gel composition is about 40 calories and is delivered to the consumer in one 1.5 oz serving.

Example 2

A method of preparing the energy gel composition set forth in Example 1, wherein the preservatives such as sodium benzoate and potassium sorbate are mixed in 50% water for about 5 minutes at a temperature of about 165-175° F. The sucrose, sodium citrate, and gum blend are mixed in a dry blender and added with the above preserved water at a temperature of about 165-175° F. for 10-20 minutes to form a hydrated gum mixture. The sweeteners, functional ingredients and color (sucralose, caffeine, guarana, ginseng, taurine, D-ribose, maltodextrin, L-carnitine, β-alanine, calcium disodium edetate) are mixed separately in a high shear mixer with 20% water for 5-10 minutes. This mixture is then added to the hydrated gum mixture in the main tank and the temperature of tank is maintained at 155-165° F. The flavor and acid are then added and the final volume is achieved by adding water. The resulting gum mixture is cooled to temperatures of 70-100° F. within an hour to arrive at the energy gel composition of Example 1.

Example 3

| Ingredients | Amount | Acceptable Range |
|---|---|---|
| Potassium Sorbate | 1.4 lbs | 1.00-3.00 lbs |
| Sodium Benzoate | 1.0 lb | 1.00-2.00 lb |
| Calcium Disodium Edetate | 0.08 lb | 0.050-1.00 lb |
| Potassium Citrate | 3.75 lb | 1.00-6.00 lb |
| Ginseng Extract Powder | 0.04 lb. | 0.02-0.800 lb |
| Anhydrous Caffeine | 1.07 lbs | 1.00-12.00 lbs |
| Gel Blend | 30 lbs | 30-50 lbs |
| Citric Acid (Anhydrous) | 6.00 lbs | 3.00-10.00 lbs |
| Phosphoric Acid (80%) | 3.00 lbs | 1.25-10.00 lbs. |
| Maltodextrin (9% to 12% DE) | 1.00 lbs | 0.50-5.00 |
| Flavor | 4.25 gal. | 2-6 gal. |
| Granulated Sucrose | 564.3 lbs | 0-800 lbs. |
| Treated Water | 2012.2 lbs | 0.00-3000.00 lbs |
| Aspartame | — | 50-225 ppm |
| Sucralose | — | 50-600 ppm |
| Acesulfame potassium | — | 50-125 ppm |
| Instant starch | — | 1.00-3.00 lbs |

Example 4

A method of preparing the energy gel composition set forth in Example 3, wherein the preservatives such as sodium benzoate, potassium sorbate, and the caffeine are mixed in 50% water at a temperature of about 145-185° F. until substantially dispersed. The maltodextrin, sodium citrate, and citric acid are then added to the heated solution. The sucrose and gel blend are mixed in a dry blender and added with the above preserved water at a temperature of about 145-185° F. for 10-20 minutes to form a hydrated gum mixture. The sweeteners, functional ingredients and color (if any) (sucralose, ginseng, calcium disodium edetate) are mixed separately under non-high shear conditions. This mixture is then added to the hydrated gum mixture in the main tank and the temperature of tank is maintained at 145-185° F. The flavor and acid are then added and the final volume is achieved by adding water. The resulting gum mixture is cooled to temperatures of 65-100° F. within an hour to arrive at the energy gel composition of Example 3. Following cooling, the energy gel composition may be refrigerated.

Example 5

In embodiments where high amounts of starch are used, the processing temperatures may be lowered to allow for the addition of aspartame into the product mixture.

Example 6

| Ingredients | Amount | Acceptable Range |
|---|---|---|
| Potassium Sorbate | 1.4 lbs | 1.00-3.00 lbs |
| Sodium Benzoate | 1.0 lb | 1.00-2.00 lb |
| Calcium Disodium Edetate | 0.08 lb | 0.050-1.00 lb |
| Sodium Citrate | 3.75 lb | 1.00-6.00 lb |
| Anhydrous Caffeine | 1.07 lbs | 0.00-12.00 lbs |
| Gum Blend | 30 lbs | 30-50 lbs |
| Citric Acid (Anhydrous) | 19.5 lbs | 3.00-30.00 lbs |
| Flavor | 4 gal. | 1-6 gal. |

-continued

| Ingredients | Amount | Acceptable Range |
|---|---|---|
| Granulated Sucrose | 624.18 lbs | 0-800 lbs. |
| Treated Water | 2029.2 lbs | 0.00-3000.00 lbs |

Example 7

A method of preparing the energy gel composition set forth in Example 6, wherein the preservatives such as sodium benzoate and potassium sorbate are mixed in 50% water for about 5 minutes at a temperature of about 165-175° F. The sucrose, sodium citrate, and gum blend are mixed in a dry blender and added with the above preserved water at a temperature of about 165-175° F. for 10-20 minutes to form a hydrated gum mixture. The sweeteners, calcium disodium edentate and color are mixed separately in a high shear mixer with 20% water for 5-10 minutes. This mixture is then added to the hydrated gum mixture in the main tank and the temperature of tank is maintained at 155-165° F. The flavor and acid are then added and the final volume is achieved by adding water. The resulting gum mixture is cooled to temperatures of 70-100° F. within an hour to arrive at the energy gel composition of Example 6.

This invention may be embodied in other specific forms without departing from the spirit or essential characteristics thereof. The foregoing embodiments, therefore, are to be considered in all respects illustrative rather than limiting the invention described herein. The scope of the invention is thus indicated by the appended claims, rather than by the foregoing description, and all changes that come within the meaning and range of equivalency of the claims are intended to be embraced therein.

What is claimed is:

1. A gel-based single serving size comestible comprising:
    6-18 g/L of a gum blend consisting of 4-12% by weight of calcium lactate, 4-12% by weight of trisodium citrate, 20-60% by weight of dextrin, and at least two gums selected from the group consisting of carrageenan, locust bean gum, xanthan gum, and gellan gum;
    caffeine;
    taurine;
    a vitamin B complex;
    at least one sweetener;
    at least one additional functional ingredient selected from the group consisting of ginseng, D-Ribose, L-carnitine, β-alanine, guarana, and combinations thereof;
    at least one preservative;
    and at least one food-grade acid;
    wherein the single serving size of the gel-based comestible is 0.5 oz to 2 oz.; and
    wherein the gel-based comestible is a solid and remains firm at or below room temperature and up to a temperature of about 125° F.

2. The gel-based comestible of claim 1 further comprising at least one buffering agent selected from the group consisting of sodium citrate, potassium citrate and combinations thereof.

3. The gel-based comestible of claim 1 further comprising at least one bulking agent selected from the group consisting of sucrose, maltodextrin, pectin and combinations thereof.

4. The gel-based comestible of claim 1 further comprising at least one calcium ion source selected from the group consisting of calcium citrate, calcium disodium edetate, calcium chloride, calcium carbonate and combinations thereof.

5. The gel-based comestible of claim 1 wherein the gel-based comestible supplies a consumer with about 200 mg caffeine and 1000 mg taurine.

6. The gel-based comestible of claim 1, wherein the gel-based comestible is easily consumed directly from the package with one bite or swallow without the need for a utensil.

7. The gel-based comestible of claim 1, wherein the gel-based comestible promotes alertness in a consumer and provides the consumer with additional energy.

8. A gel-based single serving size comestible comprising
    6-18 g/L of a gum blend consisting of 3-9% by weight of xanthan, 3-9% by weight of locust bean gum, 5-14% by weight of gellan, 12-36% by weight of carrageenan, 4-12% by weight of calcium lactate, 4-12% by weight of trisodium citrate and 20-60% by weight of dextrin;
    caffeine;
    taurine;
    a vitamin B complex;
    at least one sweetener;
    at least one additional functional ingredient selected from the group consisting of ginseng, D-Ribose, L-carnitine, 3-alanine, guarana, and combinations thereof;
    at least one preservative;
    and at least one food-grade acid;
    wherein the single serving size of the gel-based comestible is 0.5 oz to 2 oz; and wherein the gel-based comestible is a solid—and remains firm at or below room temperature and up to a temperature of about 125° F.

* * * * *